(12) United States Patent
Baker et al.

(10) Patent No.: US 7,611,598 B2
(45) Date of Patent: Nov. 3, 2009

(54) METHOD OF FORMING A REINFORCED ARTICLE

(75) Inventors: Steven E. Baker, Amarillo, TX (US);
Jeffrey L. Antle, Canyon, TX (US);
Donald R. Holman, Amarillo, TX (US)

(73) Assignee: OCV Intellectual Capital, LLC DE (US)

( * ) Notice: Subject to any disclaimer, the term of this patent is extended or adjusted under 35 U.S.C. 154(b) by 375 days.

(21) Appl. No.: 11/638,939

(22) Filed: Dec. 14, 2006

(65) Prior Publication Data

US 2007/0134490 A1 Jun. 14, 2007

Related U.S. Application Data

(62) Division of application No. 10/872,926, filed on Jun. 21, 2004, now Pat. No. 7,169,463.

(51) Int. Cl.
*D02G 3/00* (2006.01)

(52) U.S. Cl. ............ 156/242; 252/8.81; 252/8.83; 428/300.1; 428/375; 428/391; 428/392; 428/298.7; 428/299.4; 523/200; 523/217

(58) Field of Classification Search ............ 252/8.81, 252/8.83; 428/300.1, 375, 391, 392, 298.7, 428/299.4; 523/200, 217
See application file for complete search history.

(56) References Cited

U.S. PATENT DOCUMENTS

| | | | |
|---|---|---|---|
| 4,126,729 A | 11/1978 | Richardson et al. | |
| 4,309,326 A | 1/1982 | Sage et al. | |
| 4,341,877 A | 7/1982 | Das et al. | |
| 4,394,418 A | 7/1983 | Temple | |
| 4,448,910 A | 5/1984 | Haines et al. | |
| 4,477,496 A | 10/1984 | Das et al. | |
| 4,664,971 A | 5/1987 | Soens | |
| 4,678,602 A | 7/1987 | Tanaka et al. | |
| 4,745,028 A * | 5/1988 | Das et al. | 428/391 |
| 4,752,527 A * | 6/1988 | Sanzero et al. | 428/391 |
| 4,808,478 A | 2/1989 | Dana et al. | |
| 4,808,481 A | 2/1989 | Luxon | |
| 4,882,089 A | 11/1989 | Iwaskow et al. | |
| 4,882,227 A | 11/1989 | Iwase et al. | |
| 4,942,090 A | 7/1990 | Morin | |
| 4,960,642 A | 10/1990 | Kosuga et al. | |
| 5,091,255 A | 2/1992 | Hsu et al. | |
| 5,186,862 A | 2/1993 | Krijger et al. | |
| 5,236,777 A * | 8/1993 | Inoguchi et al. | 442/60 |
| 5,695,847 A | 12/1997 | Browne | |
| 5,721,047 A | 2/1998 | Thicthener et al. | |
| 6,156,427 A | 12/2000 | Gotoh et al. | |
| 6,162,536 A | 12/2000 | Montsinger | |
| 2002/0039675 A1 | 4/2002 | Braun et al. | |
| 2002/0090501 A1 | 7/2002 | Tobita | |
| 2002/0108699 A1 | 8/2002 | Cofer et al. | |

FOREIGN PATENT DOCUMENTS

| | | |
|---|---|---|
| EP | 0000683 | 2/1979 |
| JP | 7032358 | 2/1995 |
| WO | WO 86/01811 | 3/1986 |

* cited by examiner

*Primary Examiner*—Jeff Aftergut
*Assistant Examiner*—Jaeyun Lee
(74) *Attorney, Agent, or Firm*—James J. Dottavio; Kathryn W. Grant

(57) ABSTRACT

An aqueous glass fiber sizing composition that includes a polymeric film forming component, at least one silane coupling agent, and one or more lubricants is provided. The polymeric film forming component of the sizing composition includes a silanated polyvinyl acetate, an epoxidized polyvinyl acetate, and a modified epoxy emulsion. In preferred embodiments, the film formers are present in the sizing composition in ratios of 70:25:5, 50:25:25, or 63:18:18 of silanated polyvinyl acetate, epoxidized polyvinyl acetate, and modified epoxy emulsion respectively. Fibers sized with the sizing composition in a sheet molding compound process have improved wet-out characteristics.

13 Claims, No Drawings

METHOD OF FORMING A REINFORCED ARTICLE

This application is a divisional of U.S. patent application Ser. No. 10/872,926, filed Jun. 21, 2004, which is hereby incorporated by reference in its entirety.

TECHNICAL FIELD AND INDUSTRIAL APPLICABILITY OF THE INVENTION

The present invention relates generally to size compositions for glass fibers, and more particularly, to size compositions that include a film forming polymer component formed of a silanated polyvinyl acetate, an epoxidized polyvinyl acetate, and a modified epoxy emulsion.

BACKGROUND OF THE INVENTION

Glass fibers are useful in a variety of technologies. For example, glass fibers are used as reinforcements in polymer matrices to form glass fiber reinforced plastics or composites. Glass fibers have been used in the form of continuous or chopped filaments, strands, rovings, woven fabrics, non-woven fabrics, meshes, and scrims to reinforce polymers. Glass fibers are commonly used as reinforcements in polymer matrices to form glass fiber reinforced plastics or composites because they provide dimensional stability as they do not shrink or stretch in response to changing atmospheric conditions. In addition, glass fibers have high tensile strength, heat resistance, moisture resistance, and high thermal conductivity.

Typically, glass fibers are formed by attenuating streams of a molten glass material from a bushing or orifice. An aqueous sizing composition containing a film forming polymer, a coupling agent, and a lubricant is typically applied to the fibers after they are drawn from the bushing to protect the fibers from breakage during subsequent processing and to improve the compatibility of the fibers with the matrix resins that are to be reinforced. After the sizing composition has been applied, the sized fibers may be gathered into separate strands and wound to produce a glass fiber package. The glass fiber package may then be heated to remove water and deposit the size as a residue lightly coating the surface of the glass fiber. Multiple numbers of the resulting dried glass fiber packages may be consolidated and wound onto a spool referred to as a roving doff or package. The roving package is composed of a glass strand with multiple bundles of glass fibers.

Reinforcement rovings may be used in a sheet molding compound (SMC) process. In an SMC production process, a layer of a polymer film, such as an unsaturated polyester resin or vinyl ester resin premix, is metered onto a plastic carrier sheet that has a non-adhering surface. Chopped glass fiber roving bundles are then deposited onto the polymer film and a second, non-adhering carrier sheet containing a second layer of polymer film is positioned onto the first sheet such that the second polymer film contacts the chopped glass bundles and forms a sandwiched material. This sandwiched material is then kneaded to distribute the polymer resin matrix and glass fiber bundles throughout the resultant SMC material, which may then be rolled for later use in a molding process.

In the production of SMC compounds, it is desirable that the chopped glass fiber bundles contact the polymeric matrix material. One measure of this contact is referred to as wetting, which is a measure of how well the glass bundles are encapsulated by the matrix SMC resin material. It is desirable to have the glass bundles completely wet with no dry glass. Incomplete wetting during this initial processing can adversely affect subsequent processing as well as the surface characteristics of the final composite. For example, poor wetting may result in poor molding characteristics of the SMC, resulting in low composite strengths and surface defects in the final molded part. The SMC manufacturing process throughput, such as lines-speeds and productivity, are limited by how well and how quickly the roving chopped bundles can be completely wet.

Thus, there exists a need in the art for a sizing composition that improves wetting, and correspondingly the SMC production rate and the physical properties of the molded composite part.

SUMMARY OF THE INVENTION

It is an object of the present invention to provide a sizing composition that contains a film forming polymer component, a silane coupling agent, and a lubricant. The film forming polymer component is formed of a silanated polyvinyl acetate, an epoxidized polyvinyl acetate, and a modified epoxy emulsion. Non-limiting examples of modified epoxy emulsions include amine-modified emulsions and epoxy ester emulsions. The film formers are preferably present in the sizing composition in a ratio of 70:25:5, 50:25:25, or 63:18:18 of silanated polyvinyl acetate, epoxidized polyvinyl acetate, and modified epoxy emulsion respectively. The sizing composition may include a pH adjusting agent such as acetic acid, citric acid, sulfuric acid, or phosphoric acid to adjust the pH. Preferably, the sizing composition has a pH of from 3.0-7.0.

It is another object of the present invention to provide a reinforcing fiber product that contains one or more strands of a reinforcing fiber material at least partially coated with a sizing composition that contains a silanated polyvinyl acetate, an epoxidized polyvinyl acetate, a modified epoxy emulsion, a silane coupling agent, and a lubricant. Preferably the silanated polyvinyl acetate, the epoxidized polyvinyl acetate, and the modified epoxy emulsion are present in the size composition in a ratio of 70:25:5, 50:25:25, or 63:18:18 of silanated polyvinyl acetate, epoxidized polyvinyl acetate, and modified epoxy emulsion respectively. Suitable examples of the modified epoxy emulsion include amine-modified emulsions and epoxy ester emulsions. The reinforced fiber product may be in the form of a roving.

It is a further object of the present invention to provide a reinforced composite article formed of a plurality of glass fibers sized with a sizing composition that contains a silanated polyvinyl acetate, an epoxidized polyvinyl acetate, a modified epoxy emulsion, a silane coupling agent, and a lubricant. The silanated polyvinyl acetate, the epoxidized polyvinyl acetate, and the modified epoxy emulsion are preferably present in the size composition in a ratio of 70:25:5, 50:25:25, or 63:18:18 of silanated polyvinyl acetate, epoxidized polyvinyl acetate, and modified epoxy emulsion respectively. Non-exclusive examples of modified epoxy emulsions include amine-modified emulsions and epoxy ester emulsions. The reinforced composite may be in the form of an exterior body part or a structural body part of an automobile.

It is yet another object of the present invention to provide a method of forming a reinforced composite article that includes depositing chopped glass fibers at least partially coated with a sizing composition that contains a silanated polyvinyl acetate, an epoxidized polyvinyl acetate, a modified epoxy emulsion, a silane coupling agent, and a lubricant on a first polymer film, positioning a second polymer film on the chopped glass fibers to form a sandwiched material, and molding the sandwiched material into a molded composite part. Preferably, the silanated polyvinyl acetate, the epoxidized polyvinyl acetate, and the modified epoxy emulsion are present in the size composition in a ratio of 70:25:5, 50:25:25, or 63:18:18 of silanated polyvinyl acetate, epoxidized polyvinyl acetate, and modified epoxy emulsion respectively. Suitable examples of modified epoxy emulsions include, but are not limited to, amine-modified emulsions and epoxy ester emulsions.

It is an advantage of the sizing composition that the sizing composition provides improved wetting characteristics and thus fewer dry fibers in a sheet molding compound material. Improved wetting characteristics results in greater productivity in-line, a reduction in the number of defects during the molding of a composite part, and a reduction in manufacturing costs.

The foregoing and other objects, features, and advantages of the invention will appear more fully hereinafter from a consideration of the detailed description that follows.

DETAILED DESCRIPTION AND PREFERRED EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. It is to be noted that the phrases "size composition", "sizing composition", and "size" are used interchangeably herein.

The present invention relates to improved sizing compositions for fibers that may be used in a sheet molding compound (SMC) process. The sizing composition contains a film forming polymer component, at least one coupling agent, and one or more lubricants. Conventional additives may also be present in the sizing composition.

The film forming polymer component of the sizing composition contains a combination of a silanated polyvinyl acetate, an epoxidized polyvinyl acetate, and a modified epoxy emulsion. Examples of suitable silanated polyvinyl acetates include, but are not limited to, National Starch 25-1037 (Vinamul Polymers) and Franklin Duracet 660 (Franklin International). Non-limiting examples of suitable epoxidized polyvinyl acetates for use in the sizing composition include HB Fuller PD-166 (HB Fuller Company) and National Starch 25-1971 (Vinamul Polymers). Non-exclusive examples of modified epoxy emulsions that may be included in the size composition include AOC EE-732 (AOC), an amine-modified epoxy emulsion, and Neoxil 961 (DSM Italia), an epoxy ester emulsion. The film formers are preferably present in the sizing composition in a ratio of 70:25:5, 50:25:25, or 63:18:18 of silanated polyvinyl acetate, epoxidized polyvinyl acetate, and modified epoxy emulsion respectively.

The sizing composition also contains at least one coupling agent. Preferably, at least one of the coupling agents is a silane coupling agent. Silane coupling agents function to enhance the adhesion of the film forming polymers to the glass fibers and to reduce the level of fuzz, or broken fiber filaments, during subsequent processing. Examples of silane coupling agents which may be used in the present size composition may be characterized by the functional groups amino, epoxy, vinyl, methacryloxy, azido, ureido, and isocyanato. Suitable silane coupling agents for use in the size include, but are not limited to, γ-aminopropyltriethoxysilane (A-1100), n-tri-methoxy-silyl-propyl-ethylene-diamine (A-1120), γ-methacryloxypropyltrimethoxysilane (A-174), γ-glycidoxypropyltrimethoxysilane (A-187), methyl-trichlorosilane (A-154), methyl-trimethoxysilane (A-163), γ-mercaptopropyl-trimethoxy-silane (A-189), bis-(3-[triethoxysilyl]propyl)tetrasulfane (A-1289), γ-chloropropyl-trimethoxy-silane (A-143), vinyl-triethoxy-silane (A-151), vinyl-tris-(2-methoxyethoxy)silane (A-172), vinylmethyldimethoxysilane (A-2171), vinyl-triacetoxy silane (A-188), octyltriethoxysilane (A-137), methyltriethoxysilane (A-162), and methyltrimethoxysilane (A-1630). All of the silane couplings agents listed herein are available from GE Silicones. The coupling agent may be present in the sizing composition in an amount of from about 0.05% to about 0.20% active solids, and more preferably in an amount of from about 0.08 to about 0.15% active solids.

The sizing composition also contains at least one lubricant to facilitate manufacturing. Any conventional lubricant may be incorporated into the size composition. Non-exclusive examples of lubricants suitable for use in the size composition include, but are not limited to, partially amidated long-chain polyalkylene imines such as Emery 6760L (Cognis), ethyleneglycol oleates, ethoxylated fatty amines, glycerine, emulsified mineral oils, organopolysiloxane emulsions, a stearic ethanolamide such as Lubesize K-12 (AOC), and water-soluble ethyleneglycol stearates such as polyethyleneglycol monostearate, butoxyethyl stearate, and polyethylene glycol monooleate. The lubricant may be present in an amount of from about 0.025 to about 0.010% active solids.

In addition, the size composition may optionally include a pH adjusting agent, such as acetic acid, citric acid, sulfuric acid, or phosphoric acid to adjust the pH level of the composition. The pH may be adjusted depending on the intended application, or to facilitate the compatibility of the ingredients of the size composition. Preferably, the sizing composition has a pH of from 3.0-7.0, and even more preferably, a pH of from 3.5-4.5.

The sizing composition of the present invention may optionally contain conventional additives such as anti-static agents, dyes, oils, fillers, thermal stabilizers, biocides, anti-foaming agents, anti-oxidants, dust suppression agents, wetting agents, and/or any other conventional additives. The amount of additives present in the size composition is preferably not in excess of approximately 5% of the total weight of the size.

The balance of the size composition is composed of water. In particular, water may be added to dilute the aqueous sizing composition to a viscosity that is suitable for its application to glass fibers. The sizing composition may contain up to approximately 95% water.

Three exemplary sizing compositions according to the present invention are set forth in Table 1.

TABLE 1

| Material | % Active Solids | Inventive Sizing Composition 1 70/25/5 Target Weight (g) | Inventive Sizing Composition 2 50/25/25 Target Weight (g) | Inventive Sizing Composition 3 63/18/18 Target Weight (g) |
|---|---|---|---|---|
| Acetic Acid | 100.0 | 67.8 | 73.6 | 67.8 |
| A-1100[1] | 58.0 | 116.8 | 126.8 | 116.8 |
| National Starch 25-1037[2] | 55.2 | 6996.2 | 5425.6 | 6329.6 |
| PD-166[3] | 54.7 | 2523.3 | 2739.6 | 1850.1 |

TABLE 1-continued

| Material | % Active Solids | Inventive Sizing Composition 1 70/25/5 Target Weight (g) | Inventive Sizing Composition 2 50/25/25 Target Weight (g) | Inventive Sizing Composition 3 63/18/18 Target Weight (g) |
|---|---|---|---|---|
| AOC EE-732[4] | 32.4 | 851.2 | 4621.0 | 3120.6 |
| Emery 6760L[5] | 12.5 | 336.0 | 364.8 | 336.0 |
| Water (Total Used) | 0.0 | 69108.7 | 66648.6 | 68179.1 |
| Final Weight | | 80000 | 80000 | 80000 |
| Target Mix Solids | | 0.070 | 0.076 | 0.070 |

[1]γ-aminopropyltriethoxysilane (GE Silicones)
[2]silanated polyvinyl acetate (Vinamul Polymers)
[3]epoxidized polyvinyl acetate (H B Fuller Company)
[4]modified epoxy resin emulsion (AOC)
[5]partially amidated long-chain polyalkylene imine (Cognis)

The size composition may be made by first admixing the coupling agent, the acid, and the film formers with agitation to form a main mixture. If necessary, the main mixture is adjusted to a pH of approximately 3.5-7.0. The lubricant is diluted with water to form a lubricant premix, which is added to the main mixture with agitation. Water is then added in an amount to achieve the appropriate concentration and control the mix of solids.

The size composition may be applied to strands of glass formed by conventional techniques such as by drawing molten glass through a heated bushing to form substantially continuous glass fibers. Any type of glass, such as A-type glass, C-type glass, E-type glass, S-type glass, E-CR glass, or modifications thereof, is suitable for use as the fiber material. For example, in one modification of E-type glass, the boron oxide is replaced by magnesium oxide. Such a glass is commercially available from Owens Corning Fiberglass Corporation under the trade name Advantex®. Alternatively, the sizing composition may be applied to strands of one or more synthetic polymers such as polyester, polyamide, aramid, and mixtures thereof. The polymer strands may be used alone as the reinforcing fiber material, or they can be used in combination with glass strands such as those described above. Carbon fibers may also be used.

The size composition is preferably applied to the fibers and dried such that the size is present on the fibers in an amount of from about 1.0 to about 2.25% based on the total weight of the fibers. This can be determined by the loss on ignition (LOI) of the fiber rovings, which is the reduction in weight experienced by the fibers after heating them to a temperature sufficient to burn or pyrolyze the size from the fibers. To achieve the desired solids content on the fibers, the amount of water added to dilute the size mixture may be varied. The size composition may be applied to fibers having a diameter of from about 11 to about 20 microns, with fibers of from about 13 to about 16 microns in diameter being more preferred. The mix solids content of the size may range from about 5 to about 15%.

The sizing composition may be applied to the fibers in any conventional manner, such as by spraying the size composition onto the fibers or by drawing the fibers to be sized across a rotating or stationary roll wet with the sizing composition. The size composition is preferably applied to the fibers in an amount sufficient to provide the fibers with a moisture content of from about 5% by weight to about 15% by weight.

Fibers sized with the above-described sizing composition may be advantageously employed as reinforcements in a sheet molding compound (SMC), such as, for example, to form exterior body parts and structural body parts of automobiles. For example, the sizing composition may be applied to glass fibers in any conventional manner. The sized glass fibers may then be gathered into separate strands and wound to produce a glass fiber package. Next, the package may be heated to a temperature high enough to remove water from the package but not cure the sizing composition. Multiple numbers of the dried glass fiber packages may be wound onto a spool referred to as a roving doff or package (roving) and stored for later use or chopped for immediate use.

The chopped glass fibers may be placed onto a layer of a polymer film, such as an unsaturated polyester resin or vinyl ester resin, positioned on a carrier sheet that has a non-adhering surface. A second, non-adhering carrier sheet containing a second layer of polymer film may be positioned onto the chopped glass fibers in an orientation such that the second polymer film contacts the chopped glass bundles and forms a sandwiched material of polymer film-chopped glass-polymer film. This sandwiched material may then be kneaded with rollers such as compaction rollers to substantially uniformly distribute the polymer resin matrix and glass fiber bundles throughout the resultant SMC material. As used herein, the term "to substantially uniformly distribute" means to uniformly distribute or to nearly uniformly distribute. The SMC material may then be stored for 2-3 days to permit the resin to thicken and mature.

Once the SMC material has reached the target viscosity, the SMC material may be cut into charges and placed into a mold having the desired shape of the final product. The mold is heated to an elevated temperature and when it is closed, it is raised to a high pressure. This combination of high heat and high pressure causes the SMC material to flow and fill out the mold. The matrix resin then crosslinks or cures to form the final thermoset molded composite part. Exemplary molded composite parts formed by fibers sized with the inventive sizing composition include exterior automotive body parts and structural automotive body parts. The exterior automotive body parts may contain approximately 25-30% glass content and structural automotive body parts may contain approximately 30-60% glass content.

The sizing composition of the present invention provides improved wetting characteristics. Faster wetting of the glass fibers results in greater productivity in-line and the ability to produce a larger amount of SMC material per hour. In addition, faster wetting of the glass fibers results in an SMC material that contains fewer dry glass fibers. Fewer dry glass fibers in the SMC material in turn results in a reduction in the number of defects that may occur during the molding of the composite part and a reduction in the manufacturing costs associated with the production of composite parts formed from glass fibers sized with the sizing composition.

Having generally described this invention, a further understanding can be obtained by reference to certain specific examples illustrated below which are provided for purposes of illustration only and are not intended to be all inclusive or limiting unless otherwise specified.

EXAMPLES

Example 1

Class A SMC Resin Formulations

Sizing compositions containing a silanated polyvinyl acetate, an epoxidized polyvinyl acetate, a modified epoxy emulsion, A-100, and Emery 6760L with varying film former ratios were made and tested to determine the wet-out rating in a Class A resin system used for exterior automotive body panels. The wet-out rating is a subjective estimate of the percent of non-wet fibers present in an SMC line wetting test. The SMC line wetting test included placing an SMC resin on a bottom, non-adhering layer, placing dry chopped glass sized with an inventive sizing composition onto the SMC resin, and then visually rating how well the SMC resin wets up through the chopped glass bundles. The less dry glass visualized on the top of the chopped glass bundles, the lower the wet-out rating and the better the wetting. Standard rovings 973C-AA, 905A-AB, and 973C-AB sized with a polyester emulsion, a polyvinyl acetate, and a modified epoxy emulsion were evaluated as controls. The ratios of the film formers and the results are set forth in Table 2.

TABLE 2

Wetting Results in Class A SMC Resin System

| Trial | Ratio | Film Former 1 | Film Former 2 | Film Former 3 | % LOI | SMC Wet Out Rating (%) |
|---|---|---|---|---|---|---|
| Mix 1-1 | 90/5/5 | silanated PVAc | epoxidized PVAc | modified epoxy emulsion | 1.62 | 35 |
| Mix 2-1 | 50/45/45 | silanated PVAc | epoxidized PVAc | modified epoxy emulsion | 1.38 | 35 |
| Mix 3-1 | 50/5/45 | silanated PVAc | epoxidized PVAc | modified epoxy emulsion | 1.34 | 80 |
| Mix 4-1 | 70/25/5 | silanated PVAc | epoxidized PVAc | modified epoxy emulsion | 1.49 | 25 |
| Mix 5-1 | 70/5/25 | silanated PVAc | epoxidized PVAc | modified epoxy emulsion | 1.56 | 35 |
| Mix 6-1 | 50/25/25 | silanated PVAc | epoxidized PVAc | modified epoxy emulsion | 1.35 | 45 |
| Mix 7-1 | 63/18/18 | silanated PVAc | epoxidized PVAc | modified epoxy emulsion | 1.55 | 35 |
| Mix 1-2 | 90/5/5 | silanated PVAc | epoxidized PVAc | modified epoxy emulsion | 1.62 | 30 |
| Mix 2-2 | 50/45/5 | silanated PVAc | epoxidized PVAc | modified epoxy emulsion | 1.38 | 25 |
| Mix 3-2 | 50/5/45 | silanated PVAc | epoxidized PVAc | modified epoxy emulsion | 1.34 | 80 |
| Mix 4-2 | 70/25/5 | silanated PVAc | epoxidized PVAc | modified epoxy emulsion | 1.49 | 20 |
| Mix 5-2 | 70/5/25 | silanated PVAc | epoxidized PVAc | modified epoxy emulsion | 1.56 | 30 |
| Mix 6-2 | 50/25/25 | silanated PVAc | epoxidized PVAc | modified epoxy emulsion | 1.35 | 45 |
| Mix 7-2 | 63/18/18 | silanated PVAc | epoxidized PVAc | modified epoxy emulsion | 1.55 | 35 |
| Mix 8 | 90/5/5 | silanated PVAc | epoxidized PVAc | modified epoxy emulsion | 1.77 | 10 |
| Mix 9 | 70/5/25 | silanated PVAc | epoxidized PVAc | modified epoxy emulsion | 1.55 | 40 |
| Mix 10 | 63/18/18 | silanated PVAc | epoxidized PVAc | modified epoxy emulsion | 1.52 | 20 |
| Mix 11 | 63/18/18 | silanated PVAc | epoxidized PVAc | modified epoxy emulsion | 1.49 | 15 |
| Mix 12 | 63/18/18 | silanated PVAc | epoxidized PVAc | modified epoxy emulsion | 1.52 | 35 |
| Mix 13 | 90/5/5 | silanated PVAc | epoxidized PVAc | modified epoxy emulsion | 1.67 | 40 |
| Mix 14 | 63/18/18 | silanated PVAc | epoxidized PVAc | modified epoxy emulsion | 1.41 | 40 |
| Mix 15 | 70/5/25 | silanated PVAc | epoxidized PVAc | modified epoxy emulsion | 2.04 | 35 |
| Mix 16 | 63/18/18 | silanated PVAc | epoxidized PVAc | modified epoxy emulsion | 1.94 | 30 |
| Mix 17 | 70/5/25 | silanated PVAc | epoxidized PVAc | modified epoxy emulsion | 2.03 | 35 |
| Mix 18 | 63/18/18 | silanated PVAc | epoxidized PVAc | modified epoxy emulsion | 1.94 | 30 |
| Control 1 (973C-AA) | 973 K-Fiber | polyester emulsion | polyvinyl acetate | modified epoxy emulsion | 1.90 | 45 |

TABLE 2-continued

Wetting Results in Class A SMC Resin System

| Trial | Ratio | Film Former 1 | Film Former 2 | Film Former 3 | % LOI | SMC Wet Out Rating (%) |
|---|---|---|---|---|---|---|
| Control 2 (905A-AB) | 905 K-Fiber | polyester emulsion | polyvinyl acetate | modified epoxy emulsion | 1.55 | 85 |
| Control 3 (973C-AB) | 973 M-Fiber | polyester emulsion | polyvinyl acetate | modified epoxy emulsion | 1.93 | 35 |

Initially, it was determined that Control 3 had the best SMC wet-out rating of the three standard rovings. Next, the SMC wet-out percent of Control 3 was compared to the SMC wet-out percent of the fibers sized with the inventive sizing compositions. In this experiment, an SMC wet-out rating difference of 10 percent or greater was considered to be a visually significant difference and to demonstrate improved wetting characteristics. As can be seen in Table 2, Mix 4-1, 4-2, Mix 10, and Mix 11 (film forming ratios 70/25/5, 70/25/5, 63/18/18, and 63/18/18 respectively) had a wet-out rating with a difference of 10% or greater than the wet out rating of Control 3. It was concluded that ratios 70/25/5 and 63/18/18 for the film formers of the inventive sizing composition demonstrated improved wetting characteristics in Class A resin SMC systems.

Example 2

Structural SMC Formulations

Sizing compositions containing a silanated polyvinyl acetate, an epoxidized polyvinyl acetate, a modified epoxy emulsion, A-1100, and Emery 6760L with varying film former ratios were made and tested to determine the wet-out rating in a structural SMC resin system used for structural automotive body parts. The wet-out rating is a subjective estimate of the percent of non-wet fibers present in an SMC line wetting test. The SMC line wetting test included placing an SMC resin on a bottom, non-adhering layer, placing dry chopped glass sized with an inventive sizing composition onto the SMC resin, and then visually rating how well the SMC resin wets up through the chopped glass bundles. The less dry glass visualized on the top of the chopped glass bundles, the lower the wet-out rating and the better the wetting. Standard rovings 973C-AA, 905A-AB, and 973C-AB sized with a polyester emulsion, a polyvinyl acetate, and a modified epoxy emulsion were evaluated as controls. The ratios of the film formers and the results are set forth in Table 3.

TABLE 3

Wetting Results In Structural SMC Resin Systems

| Trial | Ratio | Film Former 1 | Film Former 2 | Film Former 3 | % LOI | SMC Wet Out Rating (%) |
|---|---|---|---|---|---|---|
| Mix 1-1 | 90/5/5 | silanated PVAc | epoxidized PVAc | modified epoxy emulsion | 1.62 | 50 |
| Mix 2-1 | 50/45/45 | silanated PVAc | epoxidized PVAc | modified epoxy emulsion | 1.38 | 30 |
| Mix 3-1 | 50/5/45 | silanated PVAc | epoxidized PVAc | modified epoxy emulsion | 1.34 | 20 |
| Mix 4-1 | 70/25/5 | silanated PVAc | epoxidized PVAc | modified epoxy emulsion | 1.49 | 25 |
| Mix 5-1 | 70/5/25 | silanated PVAc | epoxidized PVAc | modified epoxy emulsion | 1.56 | 15 |
| Mix 6-1 | 50/25/25 | silanated PVAc | epoxidized PVAc | modified epoxy emulsion | 1.35 | 5 |
| Mix 7-1 | 63/18/18 | silanated PVAc | epoxidized PVAc | modified epoxy emulsion | 1.55 | 10 |
| Mix 1-2 | 90/5/5 | silanated PVAc | epoxidized PVAc | modified epoxy emulsion | 1.62 | 40 |
| Mix 2-2 | 50/45/5 | silanated PVAc | epoxidized PVAc | modified epoxy emulsion | 1.38 | 20 |
| Mix 3-2 | 50/5/45 | silanated PVAc | epoxidized PVAc | modified epoxy emulsion | 1.34 | 15 |
| Mix 4-2 | 70/25/5 | silanated PVAc | epoxidized PVAc | modified epoxy emulsion | 1.49 | 20 |
| Mix 5-2 | 70/5/25 | silanated PVAc | epoxidized PVAc | modified epoxy emulsion | 1.56 | 10 |

TABLE 3-continued

Wetting Results In Structural SMC Resin Systems

| Trial | Ratio | Film Former 1 | Film Former 2 | Film Former 3 | % LOI | SMC Wet Out Rating (%) |
|---|---|---|---|---|---|---|
| Mix 6-2 | 50/25/25 | silanated PVAc | epoxidized PVAc | modified epoxy emulsion | 1.35 | 10 |
| Mix 7-2 | 63/18/18 | silanated PVAc | epoxidized PVAc | modified epoxy emulsion | 1.55 | 10 |
| Mix 8 | 90/5/5 | silanated PVAc | epoxidized PVAc | modified epoxy emulsion | 1.77 | 30 |
| Mix 9 | 70/5/25 | silanated PVAc | epoxidized PVAc | modified epoxy emulsion | 1.55 | 5 |
| Mix 10 | 63/18/18 | silanated PVAc | epoxidized PVAc | modified epoxy emulsion | 1.52 | 3 |
| Mix 11 | 63/18/18 | silanated PVAc | epoxidized PVAc | modified epoxy emulsion | 1.49 | 20 |
| Mix 12 | 63/18/18 | silanated PVAc | epoxidized PVAc | modified epoxy emulsion | 1.52 | 10 |
| Mix 13 | 90/5/5 | silanated PVAc | epoxidized PVAc | modified epoxy emulsion | 1.67 | 20 |
| Mix 14 | 63/18/18 | silanated PVAc | epoxidized PVAc | modified epoxy emulsion | 1.41 | 30 |
| Mix 15 | 70/5/25 | silanated PVAc | epoxidized PVAc | modified epoxy emulsion | 2.04 | 30 |
| Mix 16 | 63/18/18 | silanated PVAc | epoxidized PVAc | modified epoxy emulsion | 1.94 | 20 |
| Mix 17 | 70/5/25 | silanated PVAc | epoxidized PVAc | modified epoxy emulsion | 2.03 | 25 |
| Mix 18 | 63/18/18 | silanated PVAc | epoxidized PVAc | modified epoxy emulsion | 1.94 | 20 |
| Control 1 (973C-AA) | 973 K-Fiber | polyester emulsion | polyvinyl acetate | modified epoxy emulsion | 1.90 | 35 |
| Control 2 (905A-AB) | 905 K-Fiber | polyester emulsion | polyvinyl acetate | modified epoxy emulsion | 1.55 | 30 |
| Control 3 (973C-AB-1) | 973 M-Fiber | polyester emulsion | polyvinyl acetate | modified epoxy emulsion | 1.93 | 30 |

Initially, it was determined that Controls 2 and 3 had the lowest SMC wet-out rating of the three standard rovings tested. A comparison of the SMC wet-out percent of Controls 2 and 3 and the SMC wet-out percentages of the fibers sized with the inventive sizing compositions was then made. An SMC wet-out rating difference of 10 percent or greater was considered to be a visually significant difference and to demonstrate improved wetting characteristics. As can be seen in Table 3, Mix 3-1 (ratio 50/5/45), Mix 5-1 (ratio 70/5/25), Mix 6-1 (ratio 50/25/25), Mix 7-1 (ratio 63/18/18), Mix 3-2 (ratio 50/5/45), Mix 4-2 (ratio 70/25/5), Mix 5-2 (ratio 70/5/25), Mix 6-2 (ratio 50/25/25), Mix 7-2 (ratio 63/18/18), Mix 9 (ratio 70/5/25), Mix 10 (ratio 63/18/18), Mix 11 (ratio 63/18/18), Mix 12 (ratio 63/18/18), Mix 16 (ratio 63/18/18), and Mix 18 (ratio 63/18/18) had a wet-out rating with a difference of greater than 10% compared to the controls. It was therefore concluded that ratios 50/5/45, 70/25/5, 70/5/25, 50/25/25, and 63/18/18 for the film formers of the inventive sizing composition demonstrated improved wetting characteristics in structural SMC resin systems.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A method of forming a reinforced composite article comprising the steps of:
   depositing chopped glass fibers at least partially coated with a sizing composition on a first polymer film, said sizing composition including:
      a film forming polymer component including:
         a silanated polyvinyl acetate;
         an epoxidized polyvinyl acetate; and
         a modified epoxy emulsion;
      at least one silane coupling agent; and
      one or more lubricants;
   positioning a second polymer film on said chopped glass fibers to form a sandwiched material; and molding said sandwiched material into a reinforced composite article, wherein said silanated polyvinyl acetate is present in said film forming polymer component in an amount that is greater than said epoxidized polyvinyl acetate and said modified epoxy emulsion.

2. The method of claim 1, further comprising the step of:

kneading said sandwiched material to substantially uniformly distribute said glass fibers and said first and second polymer film.

3. The method of claim 1, wherein said film forming polymer component has a silanated polyvinyl acetate:epoxidized polyvinyl acetate:modified epoxy emulsion ratio selected from the group consisting of 75:25:5, 50:25:25 and 63:18:18.

4. The method of claim 3, wherein said modified epoxy emulsion is selected from the group consisting of an amine-modified epoxy emulsion and an epoxy ester emulsion.

5. The method of claim 1, wherein the size composition further comprises a pH adjusting agent.

6. The method of claim 3, wherein said at least one silane coupling agent is present in said sizing composition in an amount from 0.05% to 0.20% active solids and said one or more lubricant is present in said sizing composition in an amount from 0.025% to 0.010% active solids.

7. The method of claim 3, wherein said sizing composition further comprises at least one additive selected from the group consisting of anti-static agents, dyes, oils, fillers, thermal stabilizers, biocides, anti-foaming agents, anti-oxidants, dust suppression agents and wetting agents.

8. A method of forming a reinforced composite article comprising the steps of:

depositing chopped reinforcement fibers at least partially coated with a sizing composition on a first polymer film, said sizing composition including:

a film forming polymer component including:
  a silanated polyvinyl acetate;
  an epoxidized polyvinyl acetate; and
  a modified epoxy emulsion;
at least one silane coupling agent;
one or more lubricant;

positioning a second polymer film on said chopped glass fibers to form a sandwiched material;

kneading said sandwiched material to substantially uniformly distribute said glass fibers and said first and second polymer film; and molding said sandwiched material into a reinforced composite article, wherein said film forming polymer component has a silanated polyvinyl acetate:epoxidized polyvinyl acetate: modified epoxy emulsion ratio selected from the group consisting of 75:25:5, 50:25:25 and 63:18:18.

9. The method of claim 8, wherein said silanated polyvinyl acetate is the major constituent in said film forming polymer component.

10. The method of claim 9, wherein said reinforcement fibers are selected from the group consisting of glass fibers, modified glass fibers, carbon fibers, synthetic polymer fibers and combinations thereof.

11. The method of claim 9, wherein said modified epoxy emulsion is selected from the group consisting of an amine-modified epoxy emulsion and an epoxy ester emulsion.

12. The method of claim 11, wherein said size composition further comprises a pH adjusting agent, said pH adjusting agent adjusting the pH of said size composition to a pH of from 3.0-7.0.

13. The method of claim 9, wherein said at least one silane coupling agent is present in said sizing composition in an amount from 0.05% to 0.20% active solids and said one or more lubricant is present in said sizing composition in an amount from 0.025% to 0.010% active solids.

* * * * *